(12) United States Patent
Leppänen et al.

(10) Patent No.: US 12,093,597 B2
(45) Date of Patent: Sep. 17, 2024

(54) DISPLAY DEVICE

(71) Applicant: Nokia Technologies Oy, Espoo (FI)

(72) Inventors: Jussi Leppänen, Tampere (FI); Arto Lehtiniemi, Lempäälä (FI); Antti Eronen, Tampere (FI); Mikko Heikkinen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 222 days.

(21) Appl. No.: 17/789,394

(22) PCT Filed: Dec. 10, 2020

(86) PCT No.: PCT/EP2020/085431
§ 371 (c)(1),
(2) Date: Jun. 27, 2022

(87) PCT Pub. No.: WO2021/136640
PCT Pub. Date: Jul. 8, 2021

(65) Prior Publication Data
US 2023/0066507 A1    Mar. 2, 2023

(30) Foreign Application Priority Data
Dec. 30, 2019    (GB) ..................... 1919425

(51) Int. Cl.
*G06F 3/14*    (2006.01)
*H04N 23/63*    (2023.01)
(Continued)

(52) U.S. Cl.
CPC ......... *G06F 3/1446* (2013.01); *H04N 23/632* (2023.01); *H04R 1/028* (2013.01);
(Continued)

(58) Field of Classification Search
CPC .......... G06F 3/1446; G06F 3/167; G06F 3/16; H04N 23/632; H04R 1/028; H04R 1/08;
(Continued)

(56) References Cited

U.S. PATENT DOCUMENTS 11,146,870 B2 * 10/2021 Chopra .................... H04R 5/02
2004/0008850 A1 * 1/2004 Gustavsson ............ H04R 3/005
381/94.1
(Continued)

OTHER PUBLICATIONS

Search Report received for corresponding United Kingdom Patent Application No. 1919425.7, dated Oct. 7, 2020, 10 pages.
(Continued)

*Primary Examiner* — Padma Haliyur
(74) *Attorney, Agent, or Firm* — Nokia Technologies Oy (57) ABSTRACT

An apparatus, method and computer program is described comprising: capturing images using one or more imaging devices of a foldable user device, wherein the user device comprises a visual display, wherein, in a first mode of operation, a display output on the visual display is modified depending on a folding angle of the foldable user device; capturing audio using one or more microphones of the foldable user device; providing a wind mode indication in a second mode of operation; and disabling the modification of the visual display depending on the folding angle in the second mode of operation.

15 Claims, 9 Drawing Sheets

(51) Int. Cl.
　　　*H04R 1/02*　　　(2006.01)
　　　*H04R 1/08*　　　(2006.01)
　　　*H04R 3/00*　　　(2006.01)
(52) U.S. Cl.
　　　CPC ................ *H04R 1/08* (2013.01); *H04R 3/00* (2013.01); *H04R 2410/07* (2013.01); *H04R 2499/11* (2013.01); *H04R 2499/15* (2013.01)
(58) Field of Classification Search
　　　CPC .. H04R 3/00; H04R 2410/07; H04R 2499/11; H04R 2499/15
　　　See application file for complete search history.

(56) References Cited

U.S. PATENT DOCUMENTS

| | | | |
|---|---|---|---|
| 2015/0112407 A1* | 4/2015 | Hartley | H04R 25/606 607/57 |
| 2016/0155453 A1 | 6/2016 | Harvey et al. | |
| 2017/0052566 A1* | 2/2017 | Ka | G09G 3/035 |
| 2020/0012324 A1* | 1/2020 | Sung | G06F 1/1652 |
| 2020/0329178 A1* | 10/2020 | Moon | H04M 1/0264 |
| 2021/0021763 A1* | 1/2021 | Zhou | G01S 5/22 |
| 2021/0136481 A1* | 5/2021 | Thoen | H04R 5/033 |
| 2022/0197581 A1* | 6/2022 | Lee | G06F 9/50 |

OTHER PUBLICATIONS

International Search Report and Written Opinion received for corresponding Patent Cooperation Treaty Application No. PCT/EP2020/085431, dated Mar. 5, 2021, 12 pages.

* cited by examiner

DISPLAY DEVICE

RELATED APPLICATION

This application claims priority to PCT Application No. PCT/EP2020/085431, filed on Dec. 10, 2020, which claims priority to GB Application No. 1919425.7, filed on Dec. 30, 2019, each of which is incorporated herein by reference in its entirety.

FIELD

The present specification relates to a display device, for example to a display device comprising a foldable user device.

BACKGROUND

It is possible to provide foldable user devices (such as mobile communication devices) comprising a visual display in which the visual display is modified depending on a folding angle of the user device. However, there remains a need for further developments in this field.

SUMMARY

In a first aspect, this specification describes an apparatus comprising means for performing: capturing images (e.g. video images) using one or more imaging devices (e.g. cameras) of a foldable user device, wherein the user device comprises a visual display, wherein, in a first mode of operation (e.g. a "normal" mode of operation"), a display output on the visual display is modified depending on a folding angle of the foldable user device; capturing audio using one or more microphones of the foldable user device; providing a wind mode indication in a second mode of operation (e.g. a "wind" mode of operation); and disabling the modification of the visual display depending on the folding angle in the second mode of operation. Thus, the first and second modes of operation affect how the display is being used to display captured images. Changing the folding angle may also have one or more other effects that are not visible on the screen (e.g. rendering a beep when the apparatus is folded); such additional effects may be disabled when the apparatus is folded to combat wind noise.

In some example embodiments, providing the wind mode indication may comprise presenting a wind mode indicator on the visual display.

The apparatus may further comprise means for performing: determining whether the captured audio includes wind noise and setting the mode of operation of the user device accordingly. Determining whether the captured audio includes wind noise may be based on a wind noise threshold and/or a duration of the wind noise. In some embodiments, whether the captured audio includes wind noise may be determined at the user device; however, in some example embodiments, the determination may be made elsewhere (e.g. at a server).

In some example embodiments, the apparatus further comprises means for performing: receiving a wind mode indication input and setting the mode of operation of the user device accordingly.

The visual display of the foldable user device may comprise two or more screens. The two or more screens may, for example, be usable as a single screen in an unfolded configuration.

In embodiments in which the foldable user devices comprises two or more screens, the wind mode indication may indicate which screen of the visual display should be folded to reduce wind noise in the captured audio. The wind mode indication may indicate a direction in which the indicated screen of the visual display should be folded to reduce wind noise in the captured audio. In some example embodiments, the modification of the display output on the visual display may be disabled, in the second mode of operation, depending on the folding angle of the indicated screen of the visual display. Thus, for example, the apparatus may operate in a first/normal mode of operation if a non-indicated screen is folded (since folding that screen may not reduce wind noise).

In some example embodiments, the apparatus may further comprise means for performing: displaying one or more outputs of a folded screen of the visual display of the foldable user device on an unfolded screen of the visual display of the foldable user device; and enabling user interaction (such as zoom control) with one or more of said one or more outputs via the unfolded screen. Displaying one or more outputs of the folded screen on the unfolded screen may comprise overlaying said outputs on outputs of the unfolded screen. The one or more outputs of the folded screen may be displayed on the unfolded screen as one or more picture-in-picture views.

In some example embodiments, the apparatus may further comprise means for performing: displaying images captured by the one or more imaging devices using the visual display.

The said means may comprise: at least one processor; and at least one memory including computer program code, the at least one memory and the computer program configured, with the at least one processor, to cause the performance of the apparatus.

In a second aspect, this specification describes a method comprising: capturing images (e.g. video images) using one or more imaging devices (e.g. cameras) of a foldable user device, wherein the user device comprises a visual display, wherein, in a first mode of operation (e.g. a "normal" mode of operation"), a display output on the visual display is modified depending on a folding angle of the foldable user device; capturing audio using one or more microphones of the foldable user device; providing a wind mode indication in a second mode of operation (e.g. a "wind" mode of operation); and disabling the modification of the visual display depending on the folding angle in the second mode of operation.

In some embodiments, providing the wind mode indication may comprise presenting a wind mode indicator on the visual display.

Some example embodiments further comprise: determining whether the captured audio includes wind noise and setting the mode of operation of the user device accordingly. Determining whether the captured audio includes wind noise may be based on a wind noise threshold and/or a duration of the wind noise.

Some example embodiments further comprise: receiving a wind mode indication input and setting the mode of operation of the user device accordingly.

In embodiments in which the foldable user devices comprises two or more screens, the wind mode indication may indicate which screen of the visual display should be folded to reduce wind noise in the captured audio. The wind mode indication may indicate a direction in which the indicated screen of the visual display should be folded to reduce wind noise in the captured audio. In some example embodiments, the modification of the display output on the visual display may be disabled, in the second mode of operation, depending on the folding angle of the indicated screen of the visual display. Thus, the apparatus may operate in a first/normal mode of operation if a non-indicated screen is folded (since folding that screen may not reduce wind noise).

Some example embodiments further comprise: displaying one or more outputs of a folded screen of the visual display of the foldable user device on an unfolded screen of the visual display of the foldable user device; and enabling user interaction (such as zoom control) with one or more of said one or more outputs via the unfolded screen. Displaying one or more outputs of the folded screen on the unfolded screen may comprise overlaying said outputs on outputs of the unfolded screen. The one or more outputs of the folded screen may be displayed on the unfolded screen as one or more picture-in-picture views.

Some example embodiments further comprise: displaying images captured by the one or more imaging devices using the visual display.

In a third aspect, this specification describes an apparatus configured to perform any method as described with reference to the second aspect.

In a fourth aspect, this specification describes computer-readable instructions which, when executed by computing apparatus, cause the computing apparatus to perform any method as described with reference to the second aspect.

In a fifth aspect, this specification describes a computer program comprising instructions for causing an apparatus to perform at least the following: capturing images (e.g. video images) using one or more imaging devices (e.g. cameras) of a foldable user device, wherein the user device comprises a visual display, wherein, in a first mode of operation (e.g. a "normal" mode of operation"), a display output on the visual display is modified depending on a folding angle of the foldable user device; capturing audio using one or more microphones of the foldable user device; providing a wind mode indication in a second mode of operation (e.g. a "wind" mode of operation); and disabling the modification of the visual display depending on the folding angle in the second mode of operation.

In a sixth aspect, this specification describes a computer-readable medium (such as a non-transitory computer-readable medium) comprising program instructions stored thereon for performing at least the following: capturing images (e.g. video images) using one or more imaging devices (e.g. cameras) of a foldable user device, wherein the user device comprises a visual display, wherein, in a first mode of operation (e.g. a "normal" mode of operation"), a display output on the visual display is modified depending on a folding angle of the foldable user device; capturing audio using one or more microphones of the foldable user device; providing a wind mode indication in a second mode of operation (e.g. a "wind" mode of operation); and disabling the modification of the visual display depending on the folding angle in the second mode of operation.

In a seventh aspect, this specification describes an apparatus comprising: at least one processor; and at least one memory including computer program code which, when executed by the at least one processor, causes the apparatus to: capture images (e.g. video images) using one or more imaging devices (e.g. cameras) of a foldable user device, wherein the user device comprises a visual display, wherein, in a first mode of operation (e.g. a "normal" mode of operation"), a display output on the visual display is modified depending on a folding angle of the foldable user device; capture audio using one or more microphones of the foldable user device; provide a wind mode indication in a second mode of operation (e.g. a "wind" mode of operation); and disable the modification of the visual display depending on the folding angle in the second mode of operation.

In an eighth aspect, this specification describes an apparatus comprising: one or more imaging device of a foldable user device for capturing images (e.g. video images), wherein the user device comprises a visual display, wherein, in a first mode of operation (e.g. a "normal" mode of operation"), a display output on the visual display is modified depending on a folding angle of the foldable user device; one or more microphones (of the foldable user device) for capturing audio; an output module for providing a wind mode indication in a second mode of operation (e.g. a "wind" mode of operation); and a control module for disabling the modification of the visual display depending on the folding angle in the second mode of operation.

In a ninth aspect, this specification describes an apparatus comprising: means for capturing images (e.g. video images) using one or more imaging devices (e.g. cameras) of a foldable user device, wherein the user device comprises a visual display, wherein, in a first mode of operation (e.g. a "normal" mode of operation"), a display output on the visual display is modified depending on a folding angle of the foldable user device; means for capturing audio using one or more microphones of the foldable user device; means (e.g. an output module) for providing a wind mode indication in a second mode of operation (e.g. a "wind" mode of operation); and means (e.g. a control module) for disabling the modification of the visual display depending on the folding angle in the second mode of operation.

BRIEF DESCRIPTION OF THE DRAWINGS

Example embodiments will now be described, by way of example only, with reference to the following schematic drawings, in which.

DETAILED DESCRIPTION

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

Figure 1:
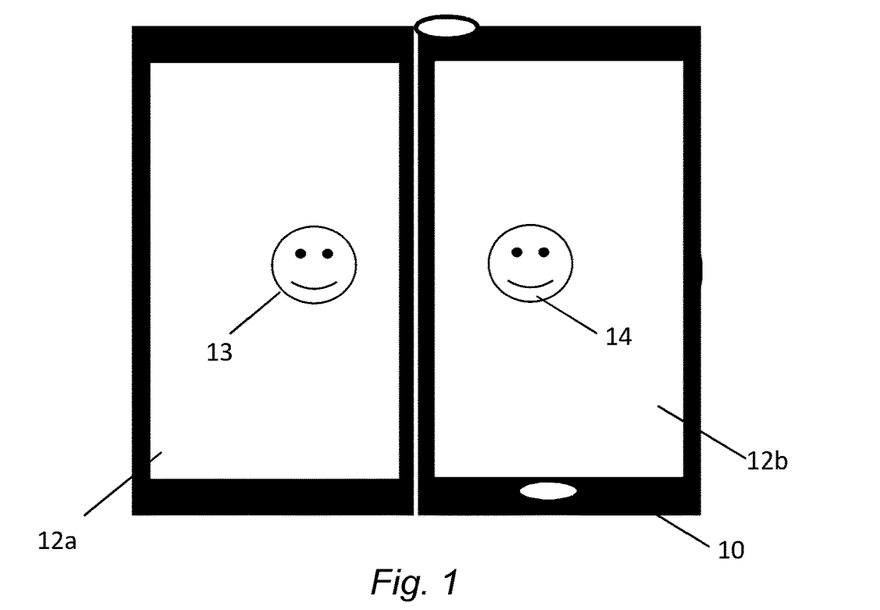
FIGS. 1 to 3 are block diagrams of user devices in accordance with example embodiments.

FIG. 1 is a block diagram of a user device 10, in accordance with an example embodiment. The user device 10 may, for example, be a mobile communication device, although this is not essential to all example embodiments.

The user device 10 comprises a first display 12a and a second display 12b. In the configuration shown in FIG. 1, the displays of the user device are flat, such that the first and second displays 12a and 12b, are operable as a single display. Thus, the example user device 10 provides a single display output 12 including a first face 13 and a second face 14 that are displayed across the first and second displays 12a and 12b. The images of the first and second faces 13 and 14 may be captured by one or more imaging devices (e.g. camera(s)) of the user device 10.

Figure 2:
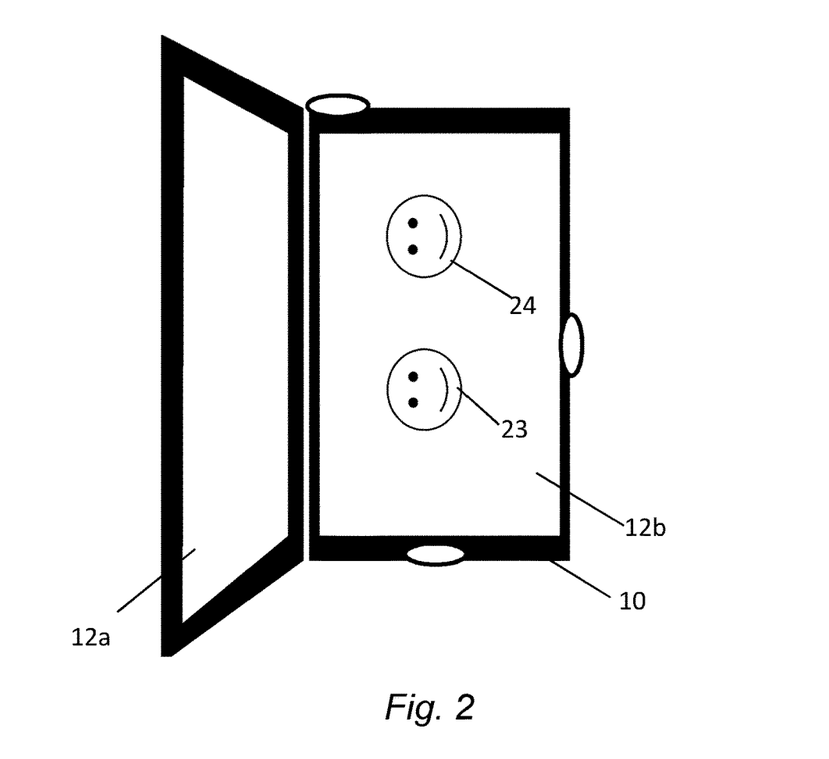

FIG. 2 is a block diagram of the user device 10 in accordance with an example embodiment. In the configuration shown in FIG. 2, the first display 12a has been folded relative to the second display 12b. The folding of the first display 12a has the effect of partially closing the overall display of the user device 10. In response to this partial closing, a display output is provided on the second display 12b only. Thus, a display output consisting of a first face 23 and a second face 24 (similar to the first face 13 and second face 14 referred to above) is presented on the second display 12b.

Figure 3:
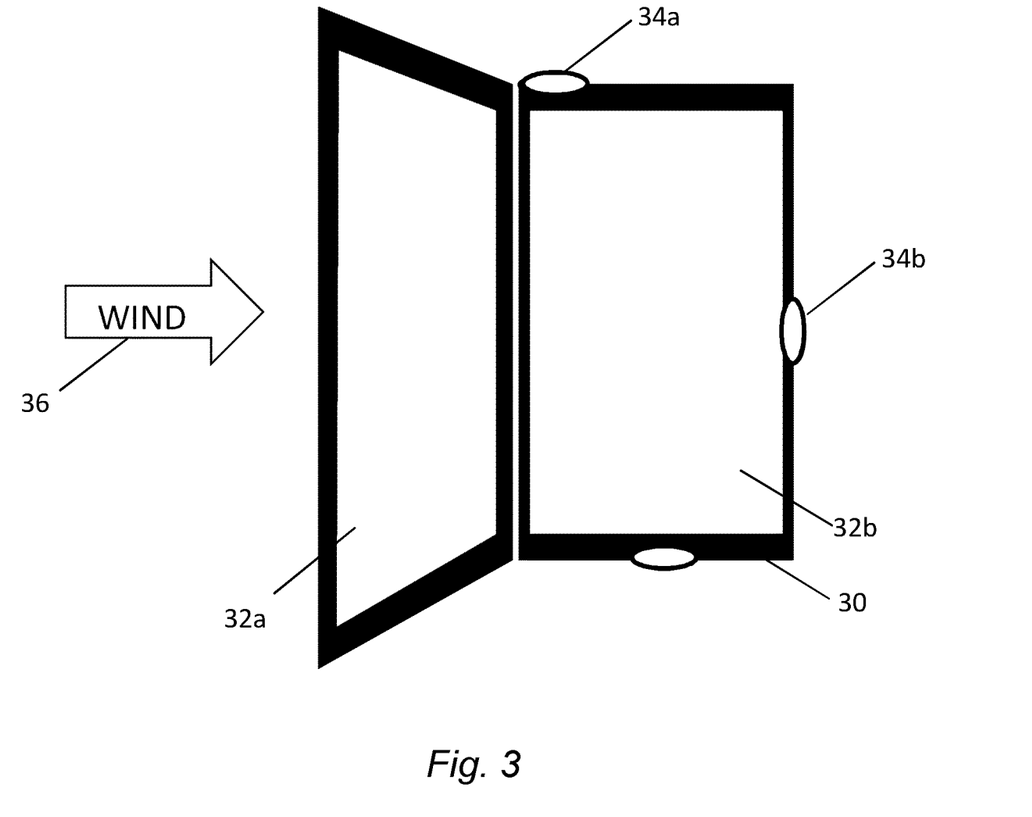

FIG. 3 is a block diagram of a user device 30, in accordance with an example embodiment. The user device 30 comprises a first display 32a and a second display 32b (similar to the first and second displays 12a and 12b described above). As shown in FIG. 3, the user device 30 further comprises a first microphone 34a and a second microphone 34b. (It should be noted that although two microphones are shown, any number of microphones, including one, could be provided in alternative embodiments.)

In an example embodiment, the user device 30 is used to capture visual (e.g. video) images of a scene (with accompanying audio). Wind is directed towards the user device generally in the direction indicated by the arrow 36, such that wind noise may impair the quality of the captured audio. The user could perhaps try to turn the user device 30 to mitigate the effects of the wind noise, but this may have an undesirable impact on the framing of visual images.

Figure 4:
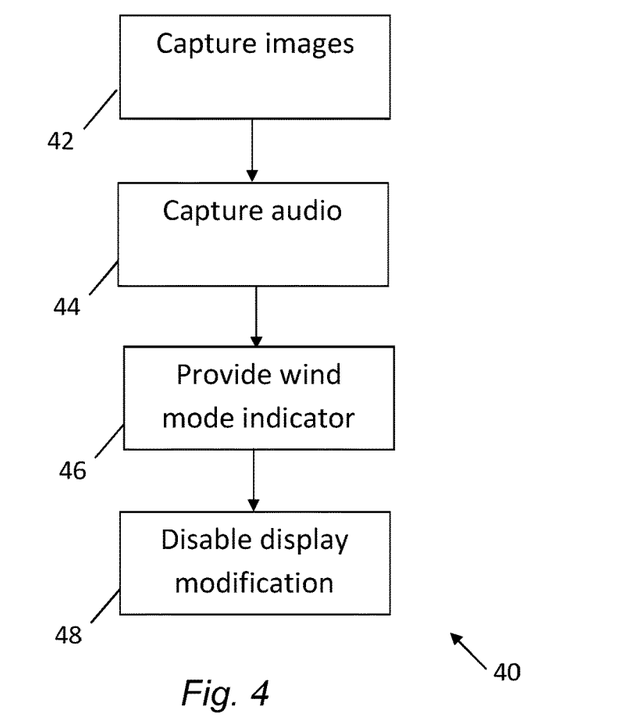
FIG. 4 is a flow chart showing an algorithm in accordance with an example embodiment.

FIG. 4 is a flow chart showing an algorithm, indicated generally by the reference numeral 40, in accordance with an example embodiment.

The algorithm 40 starts at operation 42, where images (e.g. video images) are captured using one or more imaging devices (e.g. cameras) of a foldable user device, such the user devices 10 or 30 described above. For example, as described below, the operation 42 may capture images of three faces. In a first mode of operation (which may be considered to be a normal mode of operation, although it should be noted that other operations that could be considered to be "normal" modes of operations), a display output of the user device is modified depending on a folding angle of the foldable user device, as described above with reference to FIG. 2.

Figure 5:
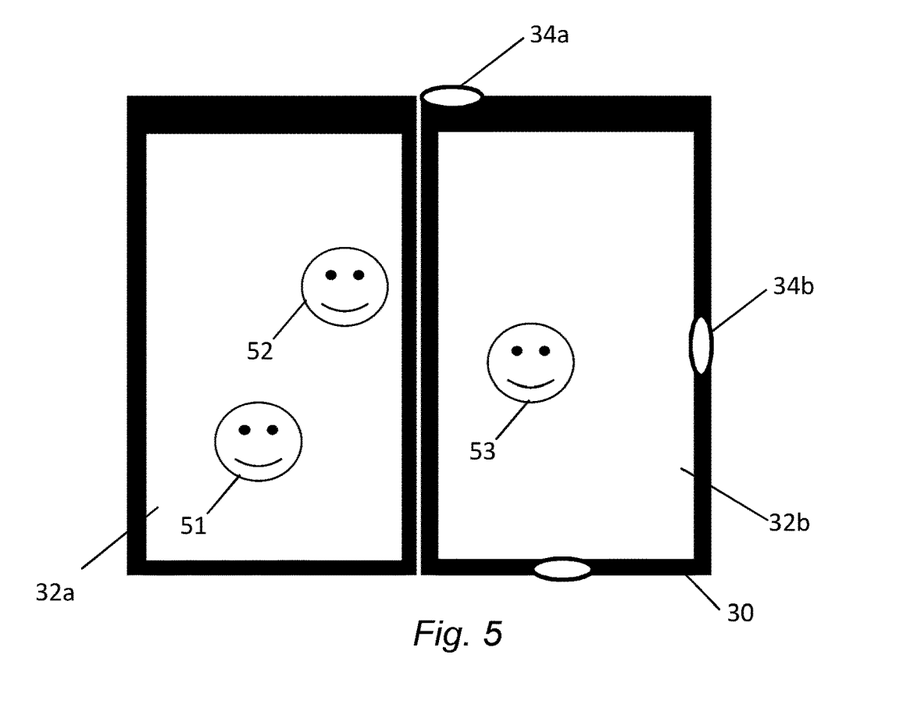
FIGS. 5 to 7 are block diagrams of user devices in accordance with example embodiments.

FIG. 5 is a block diagram of the user device 30 in accordance with an example embodiment. In the configuration shown in FIG. 5, the first and second displays 32a and 32b are in a flat configuration such that the first and second displays 32a and 32b present a single overall display output 32.

The images captured in the operation 42 include three faces that are displayed using the display output 32 of the user device 30. Specifically, the first display 32a includes a first face 51 and a second face 52 and the second display 32b includes a third face 53.

At operation 44, audio is captured (for example, using one or more microphones of the user device 30, such as the first and second microphones 34a and 34b described above). It will readily be apparent to the skilled person that the operations 42 and 44 may be carried out in a different order or at the same time.

At operation 46, in response to detecting a wind mode of operation (or a second mode of operation), a wind mode indication is provided, for example using the display output 32.

Figure 6:
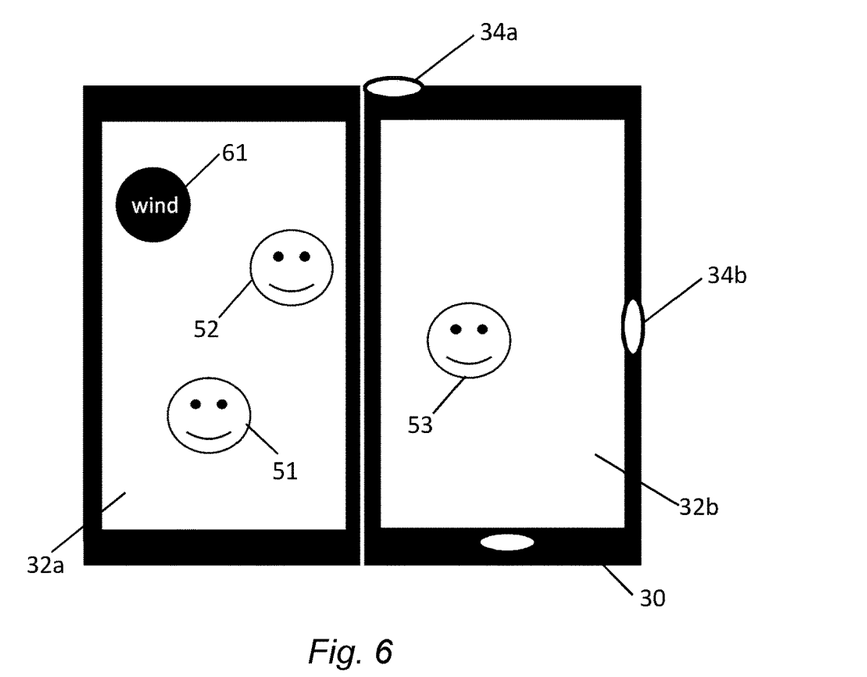

FIG. 6 is a block diagram of the user device 30 in accordance with an example embodiment. In the configuration shown in FIG. 6, the user device 30 is in the flat configuration and includes the first face 51, the second face 52 and the third face 53 described above. As shown in FIG. 6, a wind mode indicator 61 is presented on the first display 32a, thereby implementing the operation 46 of the algorithm 40.

It should be noted that many variants to the display of the wind mode indicator 61 are possible. For example, a wind mode indicator may be presented elsewhere (e.g. on the second display 32b). Moreover, the wind mode indicator could take a different form, such as an audio signal to the user, or some other visual indication that is not on the visual display, such as a flashing light on a side of the user device. The skilled person will be aware of many alternative possible arrangements.

At operation 48, the modification of the visual display depending on the folding angle (i.e. the first/normal mode of operation described above) is disabled. Thus, the user device may be considered to be operating in the second/wind mode of operation.

Figure 7:
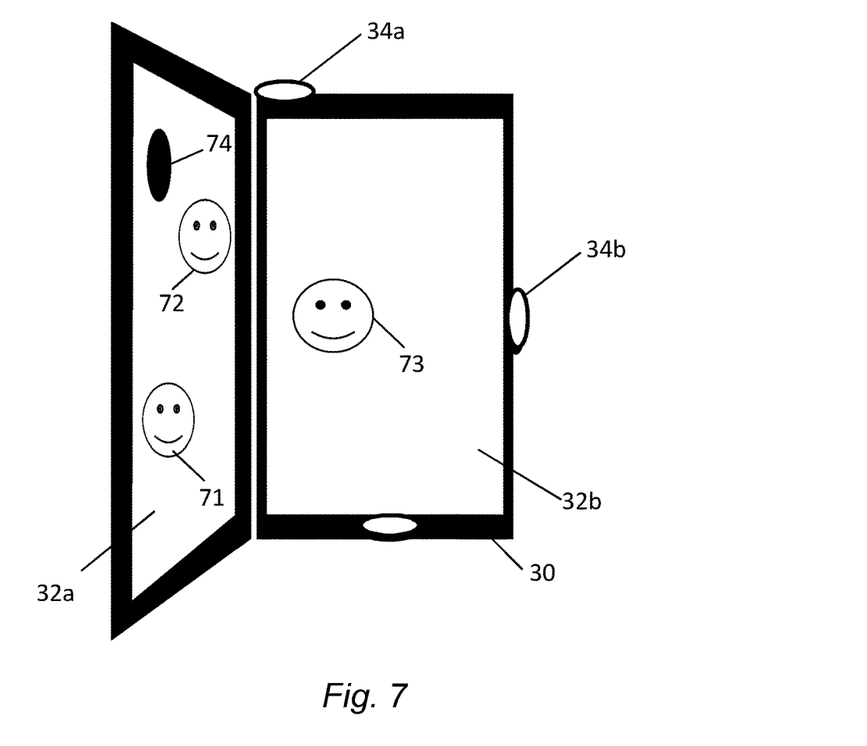

FIG. 7 is a block diagram of the user device 30 in accordance with an example embodiment. In the configuration shown in FIG. 7, the user device 30 is in a partially folded configuration. Specifically, the first display 32a is folded relative to the second display 32b, for example to seek to block the wind, such that wind noise is reduced.

In the configuration shown in FIG. 7, the user device 30 includes a first face 71, a second face 72 and a wind mode indicator 74 provided on the first display 32a and a third face 73 provided on the second display 32b. Note that the position of the faces 71 to 73 correspond to the positions of the first to third faces 51 to 53 described above, since the modification of the visual display depending on the folding angle has been disabled.

The wind mode indicator 74 may be used to indicate that the modification of the visual display depending on the folding angle has been disabled. Thus, in the event that the wind mode indicator 74 disappears, then the user interface behaviour would return to normal (i.e. the modification of the visual display depending on the folding angle would be reinstated).

Figure 8:
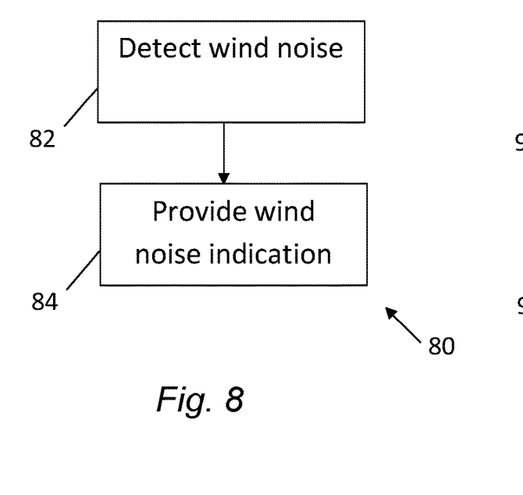
FIGS. 8 and 9 are flow charts showing algorithms in accordance with example embodiments.

FIG. 8 is a flow chart showing an algorithm, indicated generally by the reference numeral 80, in accordance with an example embodiment. The algorithm 8o is an example implementation of the operation 46 described above.

The algorithm 8o starts at operation 82, where it is determined whether captured audio (e.g. as captured in operation 44 of the algorithm 40) includes wind noise. The detection of wind noise may take many forms, such as determining whether captured audio includes wind noise above a threshold level and/or determining whether wind noise extends beyond a threshold time period. The operation 82 may be implemented at a user device (such as the user device 30), but could be implemented elsewhere (e.g. at a server).

At operation 84, a wind noise indication is provided in the event that wind noise is detected in the operation 82. The wind noise indication may, for example, take any of the forms described above. The position and/or form of the wind noise indication may correspond to the direction of the wind, as discussed further below.

Thus, in an example embodiment, wind noise may be detected by one or more of the first and second microphones 34a and 34b whilst the user device 30 is being used to record a video. A wind noise indicator (such as the wind mode indicator 61 or 74) may be presented on a display of the user device. A user may then fold the user device 30 to block wind noise without that folding affecting the visual display of the captured images.

Figure 9:
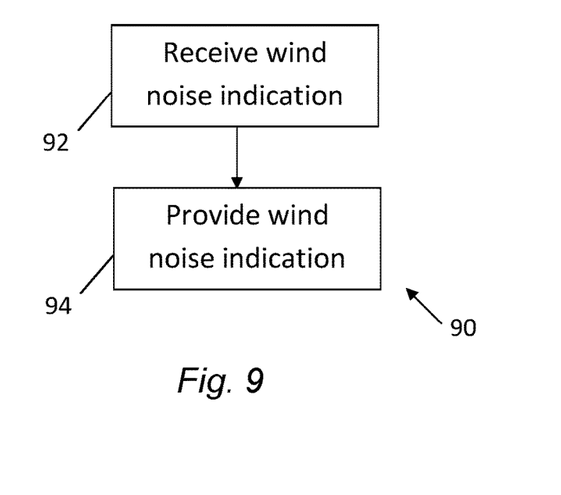

It is not essential to all embodiments that an algorithm is provided for detecting wind noise. By way of example, FIG. 9 is a flow chart showing an algorithm, indicated generally by the reference numeral 90, in accordance with an example embodiment. The algorithm 90 provides an alternative implementation of the operation 46 described above.

The algorithm 90 starts at operation 92, where wind noise indication is received (e.g. at a wind mode indication input). The wind noise indication may enable a user to provide an indication that there is wind noise in the captured audio.

At operation 94, a wind noise indication is provided in the event that a wind noise indication is received in the operation 92. The wind noise indication may take any of the forms described above. A mechanism may be provided to enable a user to indicate features of the wind noise as part of the operation 92. For example, a direction and/or an intensity of the wind noise may be indicated.

Figure 10:
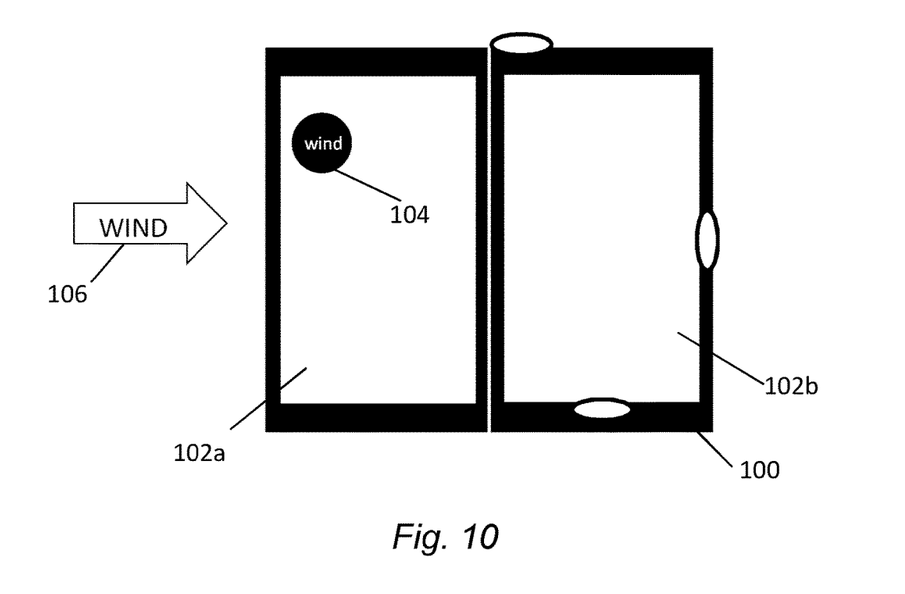
FIGS. 10 and 11 are block diagrams of user devices in accordance with example embodiments.

FIG. 10 is a block diagram of a user device 100 in accordance with an example embodiment. The user device 100 comprises a first display iota (similar to the first displays 12a and 32a described above) and a second display 102b (similar to the second displays 12b and 32b described above).

In an example embodiment, the user device 100 is used to capture visual (e.g. video) images (with accompanying audio) of a scene. Wind is directed towards the user device 100 generally in the direction indicated by the arrow 106, such that wind noise may impair the quality of the captured audio. A wind mode indicator 104 is provided on the first display iota. The position of the wind mode indicator 104 indicates which screen of the visual display should be folded to reduce wind noise in the captured audio. Furthermore, the wind mode indicator 104 may indicate a direction in which the indicated screen of the visual display should be folded to reduce wind noise in the captured audio.

Figure 11:
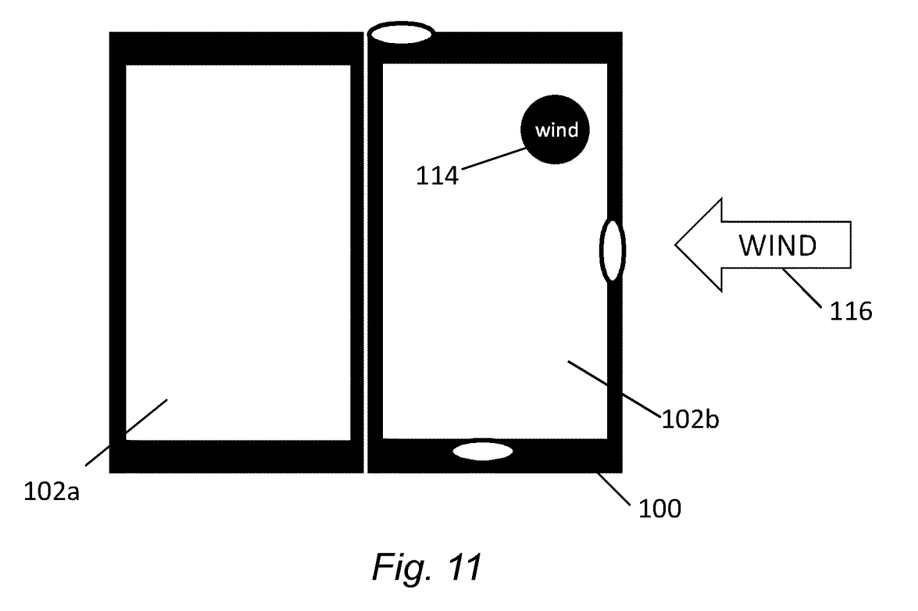

FIG. 11 is a block diagram of the user device wo in accordance with an example embodiment. In the configuration shown in FIG. 11, wind is directed towards the user device generally in the direction indicated by the arrow 116, such that wind noise may impair the quality of the captured audio. In response to the wind, a wind mode indicator 114 is provided on the second display 102b. The position of the wind mode indicator 114 indicates which screen of the visual display should be folded to reduce wind noise in the captured audio. Furthermore, the wind mode indicator 114 may indicate a direction in which the indicated screen of the visual display should be folded to reduce wind noise in the captured audio.

In arrangements in which a wind mode indicator identifies which display screen should be folded to reduce wind noise, modification of the visual display may be disabled, in the event that the indicated screen is folded. However, modification of the visual display may be enabled if a non-indicated screen is folded.

Alternatively, or in addition, in the event that a wind mode indicator indicates a direction in which a display screen should be folded to reduce wind noise, modification of the visual display may be disabled, in the event that the screen is folded in an indicated direction. However, modification of the visual display may be enabled if a screen is folded in a different direction.

In the situation described above in which the modification of a visual display is disabled in the event that the screen is folded, it can sometimes be difficult to interact with objects displayed on the folded screen. For example, touchscreen-based user interactions can be difficult to implement.

Figure 12:
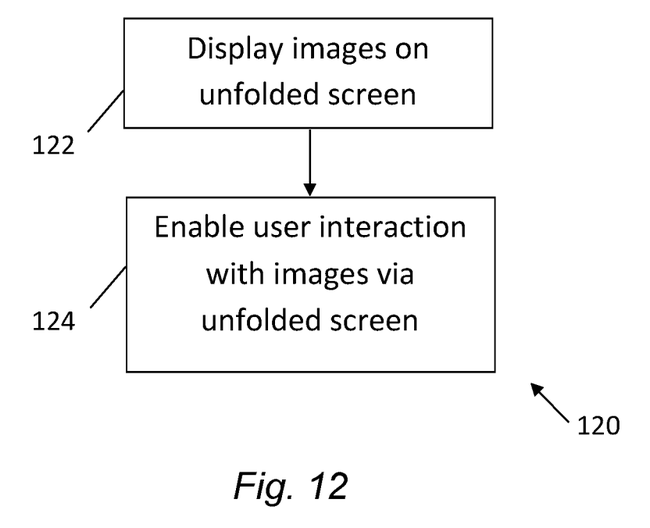
FIG. 12 is a flow chart showing an algorithm in accordance with an example embodiment.

FIG. 12 is a flow chart showing an algorithm, indicated generally by the reference numeral 120, in accordance with an example embodiment.

The algorithm starts at operation 122, where one or more outputs (e.g. images, such as video images) of a folded screen of a foldable user device are displayed on an unfolded screen of the foldable user device.

At operation 124 of the algorithm 120, user interaction with the outputs (e.g. images) of the folded screen (such as zoom control) are enabled via the unfolded screen.

Figure 13:
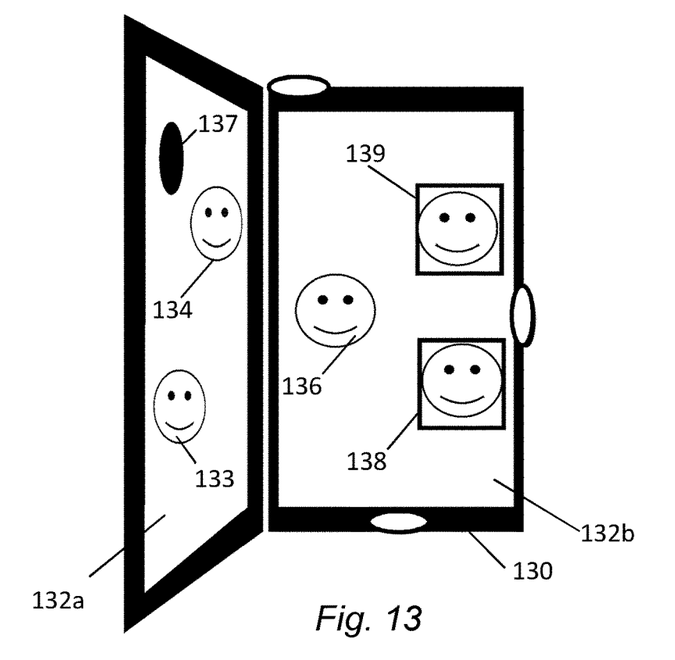
FIGS. 13 and 14 are block diagrams of user devices in accordance with example embodiments.

FIG. 13 is a block diagram of a user device 130 in accordance with an example embodiment. The user device 130 comprises a first display 132a and a second display 132b. The first display 132a is presenting a first face 133 and a second face 134, as well as a wind noise indicator 137. The second display 132b in presenting a third face 136.

The first display 132a has been folded in order to block wind noise and the modification of the user interface has been disabled. Thus, the full display 132 is used for presenting captured images (i.e. the first, second and third faces 133, 134 and 136).

As noted above, operation 124 of the algorithm 120 enables user interaction with the images of the folded screen (i.e. the first display 132a in the example user device 130) are enabled via the unfolded screen (i.e. the second display 132b). This is achieved in the example embodiment shown in FIG. 13 by overlaying views of the objects of the first display 132a on the second display 132b. The overlaid views may, for example, be picture-in-picture (PIP) views.

In the example embodiment shown in FIG. 13, the second display 132b includes a first picture-in-picture view 138 corresponding to the first face 133 and a second picture-in-picture view 139 corresponding to the second face 134. The user can then interact with the picture-in-picture views.

Figure 14:
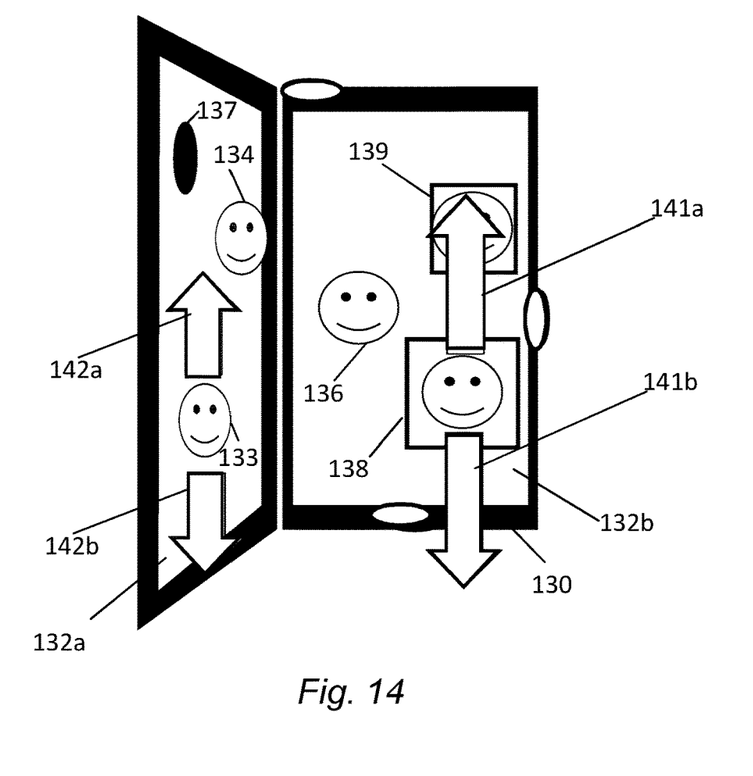

FIG. 14 is a block diagram of the user device 130 in accordance with an example embodiment. In the configuration shown in FIG. 14, a user can interact with the first picture-in-picture view 138 by indicating that a zoom function should be implemented (as indicated by the arrows 141a and 141b). In response, a zooming of the first face 133 on the first display 132a is implemented (as indicated by the arrows 142a and 142b).

Figure 15:
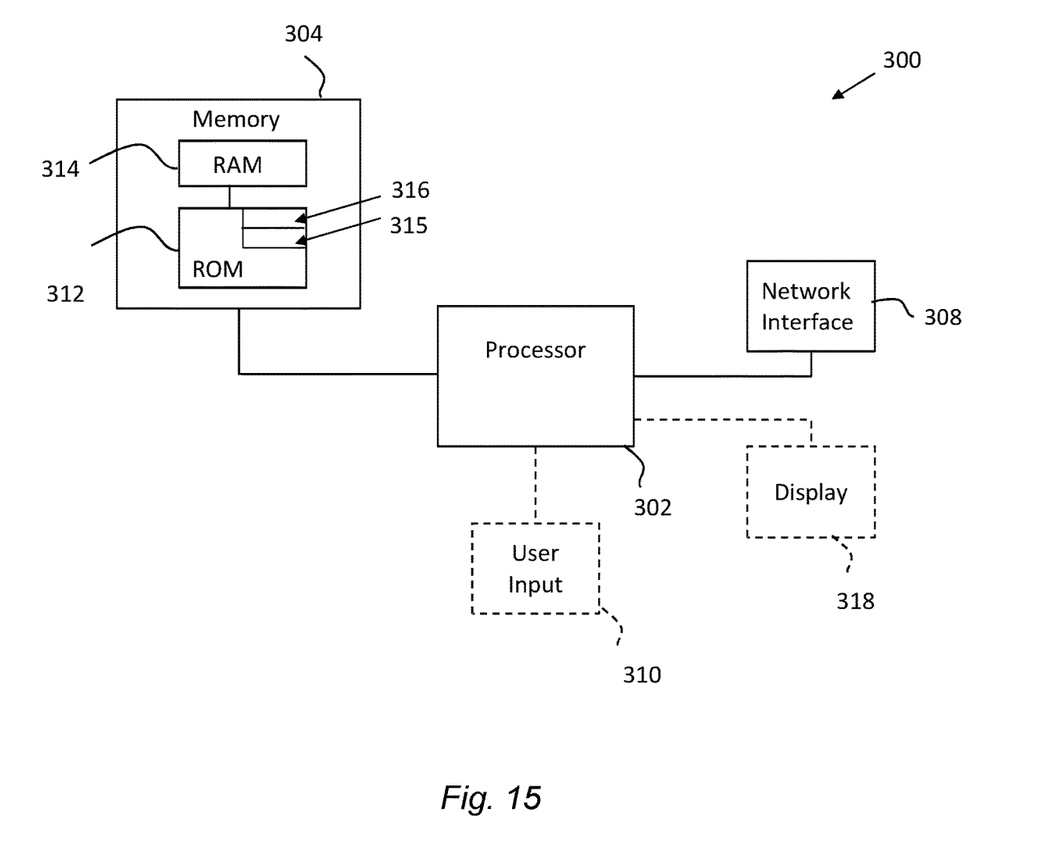
FIG. 15 is a block diagram of components of a system in accordance with an example embodiment.

For completeness, FIG. 15 is a schematic diagram of components of one or more of the example embodiments described previously, which hereafter are referred to generically as a processing system 300. The processing system 30o may, for example, be the apparatus referred to in the claims below.

The processing system 30o may have a processor 302, a memory 304 closely coupled to the processor and comprised of a RAM 314 and a ROM 312, and, optionally, a user input 310 and a display 318. The processing system 30o may comprise one or more network/apparatus interfaces 308 for connection to a network/apparatus, e.g. a modem which may be wired or wireless. The network/apparatus interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms 40, 80, 90 and 120 described above. Note that in the case of small device/apparatus the memory can be most suitable for small size usage i.e. not always a hard disk drive (HDD) or a solid state drive (SSD) is used.

The processor 302 may take any suitable form. For instance, it may be a microcontroller, a plurality of microcontrollers, a processor, or a plurality of processors.

The processing system 30o may be a standalone computer, a server, a console, or a network thereof. The processing system 30o and needed structural parts may be all inside device/apparatus such as IoT device/apparatus i.e. embedded to very small size.

In some example embodiments, the processing system 30o may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figures 16A, 16B:
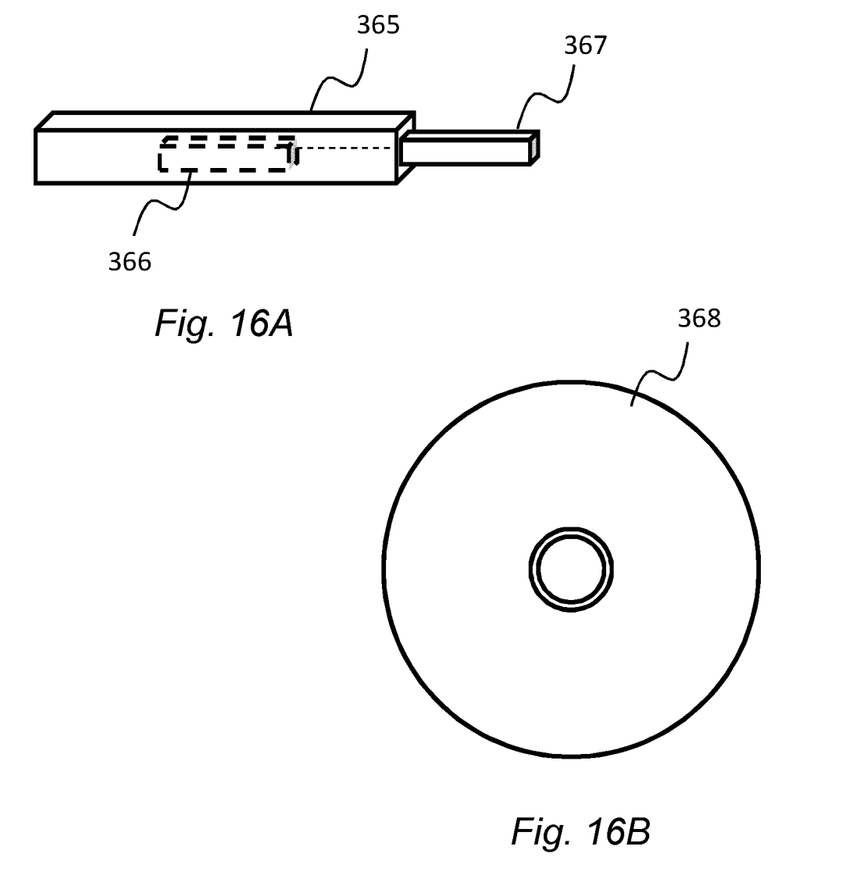
FIGS. 16A and 16B show tangible media, respectively a removable non-volatile memory unit and a Compact Disc (CD) storing computer-readable code which when run by a computer perform operations according to example embodiments.

FIGS. 16A and 16B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The internal memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams and message sequences of FIGS. 4, 8, 9 and 12 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification. For example, although the embodiments described herein include two visual displays, then principles are applicable to embodiments in which a user device comprises more than two screens.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims. It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising at least one processor; at least one memory storing instructions that, when executed by the at least one processor, cause the apparatus at least to:
   capture images using one or more imaging devices of a foldable user device, wherein the foldable user device comprises a visual display comprising two or more screens, wherein, in a first mode of operation, a display output on the visual display is modified depending on a folding angle of the foldable user device;
   capture audio using one or more microphones of the foldable user device;
   provide a wind mode indication in a second mode of operation, wherein the wind mode indication indicates which screen of the visual display should be folded to reduce wind noise in the captured audio; and disable the modification of the display output on the visual display depending on the folding angle of the indicated screen of the visual display in the second mode of operation.

2. An apparatus as claimed in claim 1, wherein providing the wind mode indication comprises presenting a wind mode indicator on the visual display.

3. An apparatus as claimed in claim 1, further configured to:

determine whether the captured audio includes wind noise and setting the mode of operation of the user device accordingly.

4. An apparatus as claimed in claim 1, further configured to:

receive a wind mode indication input and setting the mode of operation of the user device accordingly.

5. An apparatus as claimed in claim 1, wherein the wind mode indication indicates a direction in which the indicated screen of the visual display should be folded to reduce wind noise in the captured audio.

6. An apparatus as claimed in claim 1, further configured to:

display one or more outputs of a folded screen of the visual display of the foldable user device on an unfolded screen of the visual display of the foldable user device; and enable user interaction with one or more of said one or more outputs via the unfolded screen.

7. An apparatus as claimed in claim 6, wherein displaying one or more outputs of the folded screen on the unfolded screen comprises overlaying said outputs on outputs of the unfolded screen.

8. An apparatus as claimed in claim 6, further configured to:

display the one or more outputs of the folded screen on the unfolded screen as one or more picture-in-picture views.

9. An apparatus as claimed in claim 1, further configured to:

display images captured by the one or more imaging devices using the visual display.

10. A method comprising:

capturing images using one or more imaging devices of a foldable user device, wherein the foldable user device comprises a visual display comprising two or more screens, wherein, in a first mode of operation, a display output on the visual display is modified depending on a folding angle of the foldable user device;

capturing audio using one or more microphones of the foldable user device;

providing a wind mode indication in a second mode of operation, wherein the wind mode indication indicates which screen of the visual display should be folded to reduce wind noise in the captured audio; and disabling the modification of the display output on the visual display depending on the folding angle of the indicated screen of the visual display in the second mode of operation.

11. A method as claimed in claim 10, wherein providing the wind mode indication comprises presenting a wind mode indicator on the visual display.

12. A method as claimed in claim 10, further comprising:

determining whether the captured audio includes wind noise and setting the mode of operation of the user device accordingly.

13. A method as claimed in claim 10, further comprising:

receiving a wind mode indication input and setting the mode of operation of the user device accordingly.

14. A method as claimed in claim 10, wherein the wind mode indication indicates a direction in which the indicated screen of the visual display should be folded to reduce wind noise in the captured audio.

15. A non-transitory computer readable medium comprising program instructions that, when executed by an apparatus, cause the apparatus to perform at least the following:

capturing images using one or more imaging devices of a foldable user device, wherein the foldable user device comprises a visual display comprising two or more screens, wherein, in a first mode of operation, a display output on the visual display is modified depending on a folding angle of the foldable user device;

capturing audio using one or more microphones of the foldable user device;

providing a wind mode indication in a second mode of operation, wherein the wind mode indication indicates which screen of the visual display should be folded to reduce wind noise in the captured audio; and disabling the modification of the display output on the visual display depending on the folding angle of the indicated screen of the visual display in the second mode of operation.

* * * * *